United States Patent
Liao

(10) Patent No.: US 9,697,153 B2
(45) Date of Patent: Jul. 4, 2017

(54) DATA TRANSMISSION METHOD FOR IMPROVING DMA AND DATA TRANSMISSION EFFICIENCY BASED ON PRIORITIES OF AT LEAST TWO ARBITRATION UNITS FOR EACH DMA CHANNEL

(71) Applicants: ZTE Corporation, Shenzhen, Guangdong (CN); ZTE Microelectronics Technology Co., Ltd, Shenzhen (CN)

(72) Inventor: Zhou Liao, Shenzhen (CN)

(73) Assignees: ZTE CORPORATION, Shenzhen, Guangdong (CN); Sanechips Technology Co., Ltd., Shenzhen, Guangdong (CN)

( * ) Notice: Subject to any disclaimer, the term of this patent is extended or adjusted under 35 U.S.C. 154(b) by 120 days.

(21) Appl. No.: 14/431,445

(22) PCT Filed: Sep. 26, 2013

(86) PCT No.: PCT/CN2013/084355
§ 371 (c)(1),
(2) Date: Apr. 27, 2015

(87) PCT Pub. No.: WO2014/048349
PCT Pub. Date: Apr. 3, 2014

(65) Prior Publication Data
US 2015/0254197 A1    Sep. 10, 2015

(30) Foreign Application Priority Data

Sep. 26, 2012  (CN) .......................... 2012 1 0374363

(51) Int. Cl.
*G06F 13/00*   (2006.01)
*G06F 13/32*   (2006.01)
(Continued)

(52) U.S. Cl.
CPC .......... *G06F 13/32* (2013.01); *G06F 13/1642* (2013.01); *G06F 13/28* (2013.01); *G06F 13/364* (2013.01); *G06F 13/372* (2013.01)

(58) Field of Classification Search
CPC ......... G06F 13/28; G06F 13/32; G06F 13/364
(Continued)

(56) References Cited

U.S. PATENT DOCUMENTS 5,828,856 A * 10/1998 Bowes ................... G06F 13/28
710/22
5,832,278 A    11/1998 Pham
(Continued)

FOREIGN PATENT DOCUMENTS

CN       1934549 A       3/2007
CN     101032085 A       9/2007
(Continued)

OTHER PUBLICATIONS

International Search Report in international application No. PCT/CN2013/084355, mailed on Jan. 9, 2014.
(Continued)

*Primary Examiner* — Tammara Peyton
(74) *Attorney, Agent, or Firm* — Oppedahl Patent Law Firm LLC

(57) ABSTRACT

An embodiment of the disclosure relates to the field of data transmission, in particular to a data transmission method and a data transmission device, for solving the problems of low data transmission efficiency and poor Direct Memory Access (DMA) performance in a method of arbitrating each DMA channel in a round-robin mode and transmitting data according to an arbitration result. The method in the embodiment of the disclosure includes that: for each DMA channel, an arbitration unit corresponding to the channel among a plurality of arbitration units is determined according to trans-
(Continued)

mission performance corresponding to data in the channel; and when data in channels corresponding to at least two arbitration units need to be transmitted, the data are transmitted according to priorities of the at least two arbitration units. The embodiment of the disclosure first transmits data corresponding to a channel with good transmission performance corresponding to the data in the channel, and keeps a bus unblocked, thus improving data transmission efficiency and improving DMA performance.

8 Claims, 3 Drawing Sheets

(51) Int. Cl.
    *G06F 13/28*     (2006.01)
    *G06F 13/364*     (2006.01)
    *G06F 13/16*     (2006.01)
    *G06F 13/372*     (2006.01)

(58) Field of Classification Search
    USPC .................................................. 710/22, 306
    See application file for complete search history.

(56) References Cited

U.S. PATENT DOCUMENTS

| | | | |
|---|---|---|---|
| 6,513,083 B1* | 1/2003 | Fischer | G06F 13/362 710/124 |
| 8,156,260 B2* | 4/2012 | Ogawa | G06F 13/28 710/22 |
| 8,412,870 B2* | 4/2013 | Fredenberg | G06F 13/1615 710/119 |
| 8,650,347 B2* | 2/2014 | Okada | G06F 13/1605 710/116 |
| 2002/0062415 A1* | 5/2002 | Wang | G06F 13/1605 710/240 |
| 2005/0160188 A1 | 7/2005 | Bogin | |
| 2005/0223131 A1 | 10/2005 | Goekjian | |
| 2006/0221875 A1 | 10/2006 | Trainin | |
| 2007/0266187 A1 | 11/2007 | Senoo | |
| 2009/0144589 A1 | 6/2009 | Shasha | |
| 2010/0042756 A1 | 2/2010 | Ogawa | |
| 2010/0057962 A1 | 3/2010 | Okada | |
| 2011/0032997 A1 | 2/2011 | Chua | |

FOREIGN PATENT DOCUMENTS

| | | |
|---|---|---|
| CN | 101218569 A | 7/2008 |
| CN | 102017625 A | 4/2011 |

OTHER PUBLICATIONS

English Translation of the Written Opinion of the International Search Authority in international application No. PCT/CN2013/084355, mailed on Jan. 9, 2014.

Supplementary European Search Report in European application No. 13841870.2, mailed on Aug. 11, 2015.

* cited by examiner

DATA TRANSMISSION METHOD FOR IMPROVING DMA AND DATA TRANSMISSION EFFICIENCY BASED ON PRIORITIES OF AT LEAST TWO ARBITRATION UNITS FOR EACH DMA CHANNEL

TECHNICAL FIELD

The disclosure relates to the field of data transmission, in particular to a data transmission method and a data transmission device.

BACKGROUND

In the related art, an arbitration unit realizes arbitration to each Direct Memory Access (DMA) channel in a round-robin mode. As shown in FIG. 1, a first hardware module sends to a DMA arbitration unit a DMA request (e.g. transmitting data of address A to address B, and the data volume is 90 megabytes) including data transmission information through a first DMA channel. A second hardware module sends to the DMA arbitration unit a DMA request (e.g. transmitting data of address C to address D, and the data volume is 100 megabytes) including data transmission information through a second DMA channel. The DMA arbitration unit performs round-robin from the first channel from the top down in real time to determine data corresponding to the first channel, and sends to a bus command generator a command for transmitting the data corresponding to the first channel. When round-robin is performed to the second channel, it is determined that data corresponding to the second channel need to be transmitted, and a command for transmitting the data corresponding to the second channel is sent to the bus command generator. When round-robin is performed to a fifth channel, if a Central Processing Unit (CPU) sends a DMA request including data transmission information to the DMA arbitration unit through a third DMA channel, the arbitration unit will not respond to the DMA request of the CPU immediately, and will send to the bus command generator a command for transmitting data of the third channel when the DMA arbitration unit performs round-robin to the third channel in the next round-robin.

After receiving from the DMA arbitration unit the command for transmitting the data of the first channel (the DMA arbitration unit sends the command for transmitting the data of the first channel to the bus command generator for the first time), the bus command generator determines a source address, a target address and the volume of the to-be-transmitted data corresponding to the first channel (for the first channel, address A is the source address, and address B is the target address) and caches them in a bus command queue. After receiving from the bus command queue a data transmission command, a bus controller sends to a data path unit a data acquisition command to indicate the data path unit to acquire from the source address data corresponding to a data identifier. After data from the data path unit is received, the acquired data are written in the target address, wherein the bus command queue is a First In First Out (FIFO) data buffer.

In the process above, provided that data transmission rates corresponding to the first channel, the second channel and the third channel are relatively low, a bus blockage will be caused when the data path unit reaches its upper limit of processing. Therefore, when other hardware modules send DMA requests to the DMA arbitration unit through a fourth channel, the fifth channel and a sixth channel, the DMA arbitration unit will stop processing the DMA requests, which results in a relatively low data transmission efficiency and poor DMA performance.

To sum up, the current method of arbitrating each DMA channel in a round-robin mode and transmitting data according to an arbitration result by a DMA arbitration unit is low in data transmission efficiency and poor in DMA performance.

SUMMARY

Embodiments of the disclosure provide a data transmission method and a data transmission device, for solving the problems of low data transmission efficiency and poor DMA performance in a method of arbitrating each DMA channel in a round-robin mode and transmitting data according to an arbitration result in the related art.

An embodiment of the disclosure provides a data transmission method, including:

for a Direct Memory Access (DMA) channel, determining an arbitration unit corresponding to the channel among a plurality of arbitration units according to transmission performance corresponding to data in the channel;

when determining that data in channels corresponding to at least two arbitration units need to be transmitted, transmitting the data according to priorities of the at least two arbitration units.

An embodiment of the disclosure provides a data transmission device, including:

a determining module configured, for a Direct Memory Access (DMA) channel, to determine an arbitration unit corresponding to the channel among a plurality of arbitration units according to transmission performance corresponding to data in the channel;

a processing module configured, when determining that data in channels corresponding to at least two arbitration units need to be transmitted, to transmit the data according to priorities of the at least two arbitration units.

In the embodiments of the disclosure, a plurality of arbitration units is applied. For a DMA channel, an arbitration unit corresponding to the channel among the plurality of arbitration units is determined according to the transmission performance corresponding to data in the channel; and when it is determined that data in channels corresponding to at least two arbitration units need to be transmitted, the data are transmitted according to the priorities of the at least two arbitration units. For a channel, the better the transmission performance corresponding to data in the channel is, the sooner the data corresponding to the channel will be transmitted, thus first transmitting data corresponding to the channel with good transmission performance corresponding to the data in the channel. Such application of priorities keeps a bus unblocked, thus further improving data transmission efficiency and improving DMA performance.

DETAILED DESCRIPTION

In the embodiments of the disclosure, a plurality of arbitration units is applied. For a DMA channel, an arbitration unit corresponding to the channel among the plurality of arbitration units is determined according to transmission performance corresponding to data in the channel; and when it is determined that data in channels corresponding to at least two arbitration units need to be transmitted, the data are transmitted according to priorities of the at least two arbitration units. For a channel, the better the transmission performance corresponding to data in the channel is, the sooner the data corresponding to the channel will be transmitted, thus first transmitting data corresponding to the channel with good transmission performance corresponding to the data in the channel. Such application of priorities keeps a bus unblocked, thus further improving data transmission efficiency and improving DMA performance.

The embodiments of the disclosure will be further described in details below in combination with the drawings of the specification.

Figure 1:
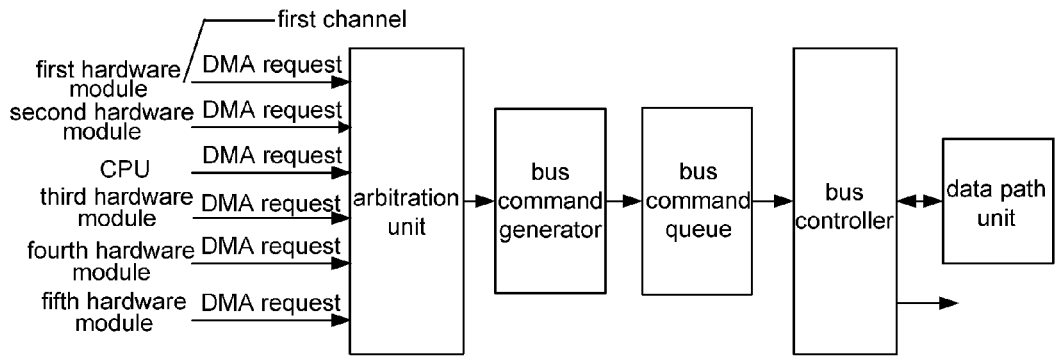
FIG. 1 is an arbitration structure in the related art.
Figure 2:
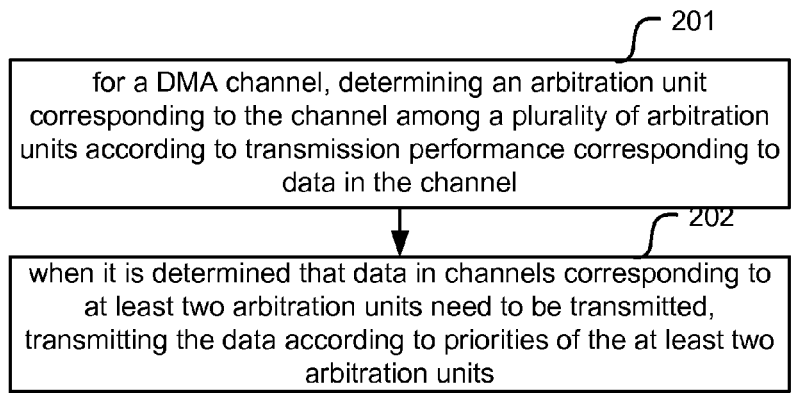
FIG. 2 is a flowchart of a data transmission method in an embodiment of the disclosure.

As shown in FIG. 2, a data transmission method in an embodiment of the disclosure includes the following steps:

Step 201: for a DMA channel, determining an arbitration unit corresponding to the channel among a plurality of arbitration units according to transmission performance corresponding to data in the channel;

Step 202: when it is determined that data in channels corresponding to at least two arbitration units need to be transmitted, transmitting the data according to priorities of the at least two arbitration units.

Preferably, for a DMA channel, before transmitting the data corresponding to the channel, step 201 further includes:

a hardware module sends to the arbitration unit a DMA request through the channel to request for data transmission, wherein when sending a DMA request for the first time, all hardware modules need to send the DMA request to the same arbitration unit through their respective channels.

During implementation, the hardware module may be any hardware module participating in data transmission, e.g. a CPU, a Random Access Memory (RAM), and so on, and a specific hardware module may be configured as required.

Figure 3:
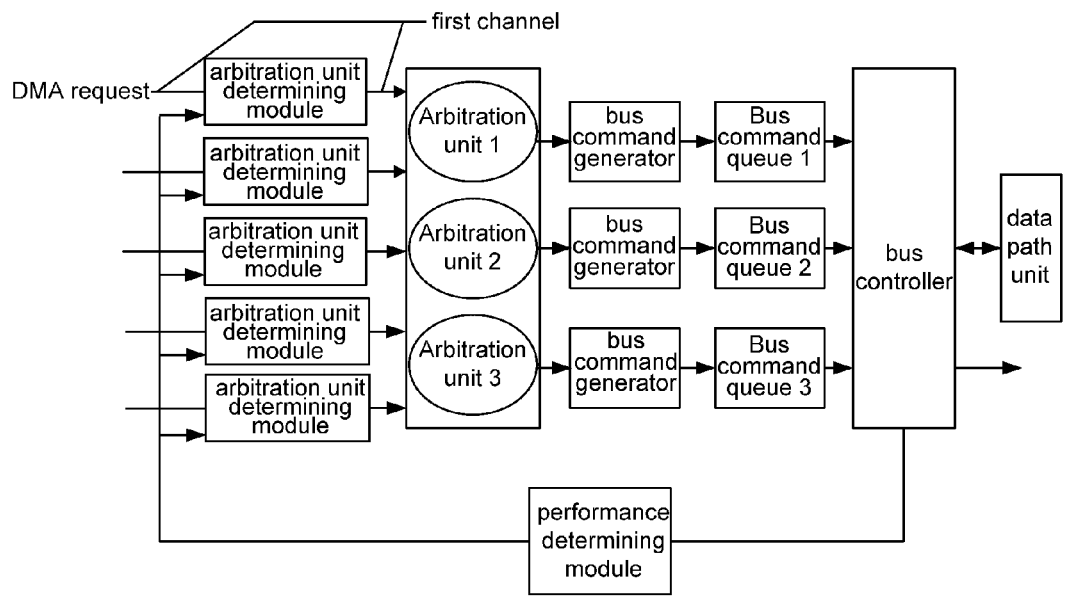
FIG. 3 is an arbitration structure in an embodiment of the disclosure.

Taking FIG. 3 for example, each hardware module may send to an arbitration unit 1 a DMA request through the respective corresponding channel to request for data transmission.

During implementation, a first hardware module may send to the arbitration unit 1 a DMA request through a plurality of any channels, e.g. a DMA request is sent to the arbitration unit 1 through a first channel, or a DMA request may be sent to the arbitration unit 1 through the first channel and a second channel.

wherein in the embodiment of the disclosure, description is provided by taking the first hardware module, a second hardware module, a third hardware module, a fourth hardware module and a fifth hardware module sending a DMA request to the arbitration unit 1 for example. Preferably, the first hardware module, the second hardware module, the third hardware module, the fourth hardware module and the fifth hardware module may also send a DMA request to other arbitration units, and a specific arbitration unit to which a DMA request is sent may be set as required.

Preferably, the arbitration unit may determine, through a fixed priority or in a round-robin mode, a channel in which corresponding data need to be transmitted, and send a command for transmitting the data corresponding to the channel, wherein the determining by the arbitration unit, through the fixed priority or in the round-robin mode, the channel in which the corresponding data need to be transmitted belongs to the related art. The determining by the arbitration unit, in the round-robin mode, the channel in which the corresponding data need to be transmitted may specifically refer to the background of the disclosure; and the determining by the arbitration unit, through the fixed priority, the channel in which the corresponding data need to be transmitted may specifically refer to web site http://wiki.cnki.com.cn/HotWord/2373471.htm, wherein the arbitration unit sends to a bus command generator corresponding to the arbitration unit a command for transmitting the data corresponding to the channel.

Taking FIG. 3 for example, if the arbitration unit 1 receives DMA requests from the first hardware module and the second hardware module within a set period of time, the arbitration unit 1 first determines in the round-robin mode that data in the first channel need to be transmitted, determines to first transmit the data corresponding to the first channel, and sends to a bus command generator 1 a command for transmitting the data corresponding to the first channel; the arbitration unit 1 continues to perform round-robin to determine that data in the second channel need to be transmitted, and sends to the bus command generator 1 a command for transmitting the data corresponding to the second channel; the arbitration unit 1 continues to perform round-robin, and when determining that no data in a third channel need to be transmitted, the fifth hardware module sends to the arbitration unit 1 a DMA request through a fifth channel. The arbitration unit 1 continues to perform round-robin instead of processing the DMA request from the fifth hardware module immediately, determines that no data in a fourth channel need to be transmitted, continues to perform round-robin to determine that data in the fifth channel need to be transmitted, and sends to the bus command generator 1 a command for transmitting the data corresponding to the fifth channel.

During implementation, a mark is made on an arbitrated channel to indicate an arbitration unit to determine according to the mark whether the channel has been arbitrated. Preferably, different marks may be made on a channel that has been arbitrated for different times to indicate the arbitration unit to determine according to the marks how many times the channel has been arbitrated, wherein a mark may be any mark, according to which the arbitration unit can determine whether the channel has been arbitrated and/or according to which the arbitration unit can determine how many times the channel has been arbitrated, e.g. a number or a letter.

Preferably, according to a command from the arbitration unit, a source address corresponding to the channel, a target address corresponding to the channel and a data identifier corresponding to the channel are determined;

wherein the command from the arbitration unit may be received by the bus command generator corresponding to the arbitration unit.

During implementation, in the source address corresponding to the channel, data corresponding to the data identifier may be a part of data in data requested to be transmitted in the DMA request.

Taking FIG. 3 for example, if the arbitration unit 1 receives DMA requests from the first hardware module and the second hardware module within a set period of time, the arbitration unit 1 first determines in the round-robin mode that data in the first channel need to be transmitted, determines to first transmit the data corresponding to the first channel, and sends to the bus command generator 1 a command for transmitting the data corresponding to the first channel. The bus command generator 1 receives the command from the arbitration unit 1, determines a source address corresponding to the first channel, a target address corresponding to the first channel and a data identifier corresponding to the first channel so as to indicate to acquire data corresponding to the data identifier in the source address, and transmits the acquired data to the target address.

During implementation, if the first hardware module sends a DMA request to transmit data of 100 megabytes in the source address corresponding to the first channel, data corresponding to the data identifier may be data of 20 megabytes in the source address corresponding to the first channel. The arbitration unit 1 first determines in the round-robin mode that data in the second channel need to be transmitted, determines to first transmit the data corresponding to the second channel and sends to the bus command generator 1 a command for transmitting the data corresponding to the second channel. The bus command generator 1 receives the command from the arbitration unit 1, determines a source address corresponding to the second channel, a target address corresponding to the second channel, a data identifier corresponding to the second channel to indicate to acquire data corresponding to the data identifier in the source address, and transmits the acquired data to the target address.

Preferably, for a plurality of received commands from the arbitration unit, a source address corresponding to the channel, a target address corresponding to the channel and a data identifier corresponding to the channel are determined.

Preferably, for a plurality of DMA requests, a plurality of commands from the arbitration unit will be received to determine source addresses corresponding to a plurality of channels, target addresses corresponding to the channels, and information of data identifiers corresponding to the channels.

Taking FIG. 3 for example, if the arbitration unit 1 receives DMA requests from the first hardware module and the second hardware module within a set period of time, the arbitration unit 1 first determines in the round-robin mode that data in the first channel need to be transmitted, determines to first transmit the data corresponding to the first channel, and sends to the bus command generator 1 a command for transmitting the data corresponding to the first channel. The bus command generator 1 receives the command from the arbitration unit 1, determines a source address corresponding to the first channel, a target address corresponding to the first channel and a data identifier corresponding to the first channel. The arbitration unit 1 determines in the round-robin mode that data in the second channel need to be transmitted, determines to transmit the data corresponding to the second channel, and sends to the bus command generator 1 a command for transmitting the data corresponding to the second channel. The bus command generator 1 receives the command from the arbitration unit 1, and determines a source address corresponding to the second channel, a target address corresponding to the second channel and a data identifier corresponding to the second channel.

During specific implementation, a bus command queue is applied to storing source addresses corresponding to a plurality of channels, target addresses corresponding to the channels, and information of data identifiers corresponding to the channels;

wherein the bus command queue may be any storage device, e.g. an FIFO data buffer;

wherein for one channel, a source address corresponding to the channel, a target address corresponding to the channel and information of a data identifier corresponding to the channel are determined, i.e. a data transmission command is determined, and the bus command queue transmits the data transmission command to a bus controller in an FIFO mode.

Preferably, for a DMA channel, transmitting data corresponding to the channel includes:

determining a source address corresponding to the channel, a target address corresponding to the channel and a data identifier corresponding to the channel;

acquiring data corresponding to the data identifier in the source address and transmitting the data to the target address.

Preferably, in step 201, for a DMA channel, the transmission performance corresponding to the data in the channel may be a transmission time of the data corresponding to the channel, or a transmission rate of the data corresponding to the channel.

During implementation, the transmission performance corresponding to the data in the channel is determined by a performance determining module;

wherein the transmission performance corresponding to data in channels may be different, i.e. for all channels, the transmission time of data corresponding to the channels may be different; or for all channels, the transmission rates of data corresponding to the channels may be different.

Embodiment 1

The Performance Determining Module Determines the Transmission Time of the Data Corresponding to the Channel After receiving the data transmission command, the bus controller determines the source address, the target address and the data identifier, sends to a data path a data acquisition command to indicate the data path to acquire the data corresponding to the data identifier from the source address and to send the acquired data corresponding to the data identifier to the bus controller. The bus controller transmits the acquired data corresponding to the data identifier to the target address;

wherein the transmission time refers to a duration from the moment when the bus controller sends to the data path the data acquisition command to the moment when the acquired data corresponding to the data identifier and returned by the data path are received.

Preferably, acquisition of the transmission time may be implemented by setting a timer. The timer is started when the bus controller sends to the data path the data acquisition command, and the timer is closed when the acquired data corresponding to the data identifier and returned by the data path are received.

Embodiment 2

The Performance Determining Module Determines the Transmission Rate of the Data Corresponding to the Channel Preferably, the determining the transmission rate of the data corresponding to the channel includes:

Step S1: determining a transmission time and a transmission capacity of the data corresponding to the channel;

Step S2: according to the transmission time and the transmission capacity, determining the transmission rate of the data corresponding to the channel, wherein in the first embodiment, the transmission time of the data corresponding to the channel, which is determined by the performance determining module, is the same as the transmission time of the data corresponding to the channel, which is determined in step S1;

wherein the transmission capacity refers to a data volume corresponding to the data identifier.

In step S2, the determining the transmission rate of the data corresponding to the channel according to the transmission time and the transmission capacity includes:

the ratio of the transmission capacity to the transmission time may be set as the transmission rate of the data corresponding to the channel.

Taking FIG. 3 for example, if the bus command queue sends to the bus controller a data transmission command including a source address corresponding to the first channel, a target address corresponding to the first channel and a data identifier corresponding to the first channel, the source address corresponding to the first channel is an Accumulator (ACC), the target address corresponding to the first channel is a Program Counter (PC), and data corresponding to the data identifier M1 corresponding to the first channel is delay data, the bus controller sends to a data path a data acquisition command including the ACC and the M1, and immediately sends to a performance determining module an starting command to indicate the timer in the performance determining module to start timing.

After receiving the data command, the data path acquires from the ACC data corresponding to the M1, and sends the acquired delay data to the bus controller. When receiving the delay data from the data path, the bus controller immediately sends a closing command to the performance determining module to indicate the timer in the performance determining module to stop timing.

If the performance determining module determines according to the timing of the timer that the transmission time is 1 second (S) and determines according to the delay data from the bus controller that the transmission capacity is 10 bytes (B), the ratio of the transmission capacity to the transmission time (10/1=10 bps) is determined to be the transmission rate of the data corresponding to the channel.

Preferably, the performance determining module is integrated in the bus controller, which can reduce errors in the transmission time.

Preferably, in step 201, the determining the arbitration unit corresponding to the channel among the plurality of arbitration units according to the transmission performance corresponding to the data in the channel includes:

Step Z1: determining a threshold range of the transmission performance corresponding to the data in the channel;

Step Z2: according to a corresponding relation of the arbitration units and the threshold range, determining an arbitration unit corresponding to the threshold range of the transmission performance corresponding to the data in the channel, and using the determined arbitration unit corresponding to the threshold range as the arbitration unit corresponding to the channel.

During implementation, an arbitration unit determining module determines the threshold range of the transmission performance corresponding to the data in the channel, determines, according to the corresponding relation of the arbitration units and the threshold relation, the arbitration unit corresponding to the threshold range of the transmission performance corresponding to the data in the channel, and determines the arbitration unit corresponding to the threshold range as the arbitration unit corresponding to the channel.

Preferably, before step Z1, the method further includes:

the arbitration unit determining module receives from the performance determining module the transmission performance corresponding to the data in the channel.

Preferably, in step Z2, the corresponding relation of the arbitration units and the corresponding range may be stored in the arbitration unit determining module, or may be also stored in other storage entities, and is taken from other storage entities when the arbitration determining module needs to use the corresponding relation of the arbitration units and the threshold range.

Description is provided as follows by taking the transmission performance corresponding to the data in the channel being the transmission rate of the data corresponding to the channel for example. Implementation of the transmission performance corresponding to the data in the channel being the transmission time of the data corresponding to the channel is the same as implementation of the transmission performance corresponding to the data in the channel being the transmission rate of the data corresponding to the channel, and will not be repeated here.

A threshold range of the transmission rate of the data corresponding to the channel is determined.

According to a corresponding relation of the arbitration units and the threshold range, an arbitration unit corresponding to the threshold range of the transmission rate of the data corresponding to the channel is determined, and the arbitration unit corresponding to the threshold range is determined to be the arbitration unit corresponding to the channel;

wherein the transmission performance corresponding to the data in the channel is the transmission rate of the data corresponding to the channel, and the threshold range is a rate threshold range. In the case that the transmission performance corresponding to the data in the channel is the transmission time of the data corresponding to the channel, and the threshold range is a transmission time threshold range.

Taking FIG. 3 for example, if the transmission rate of the data corresponding to the channel is 58 bps, the corresponding relation of the arbitration units and the threshold range is: if the transmission rate of the data corresponding to the channel is smaller than 50 bps, the corresponding arbitration unit is the arbitration unit 3; if the transmission rate of the data corresponding to the channel is 50 bps to 90 bps, the corresponding arbitration unit is the arbitration unit 2; if the transmission rate of the data corresponding to the channel is greater than 90 bps, the corresponding arbitration unit is the arbitration unit 1;

then the arbitration unit determining module determines that the threshold range of the transmission rate of the data corresponding to the channel is 50 bps to 90 bps, and determines according to the corresponding relation of the arbitration units and the threshold range, that the arbitration unit corresponding to the channel is the arbitration unit 2.

In specific implementation, the corresponding relation of the arbitration units and the threshold range may be set according to specific application scenarios;

wherein when there are two arbitration units, the threshold range may be determined through weighting transmission rates of data corresponding to all channels.

Taking FIG. 3 for example, if the transmission rate of the data corresponding to the first channel is 20 bps, the transmission rate of the data corresponding to the second channel is 40 bps, the transmission rate of the data corresponding to the third channel is 60 bps, the transmission rate of the data corresponding to the fourth channel is 50 bps, and the transmission rate of the data corresponding to the fifth channel is 60 bps, a weighted value of the transmission rates of the data corresponding to all channels is 46 bps, and it is determined that the corresponding relation between the arbitration units and the threshold range is: if the transmission rate of the data corresponding to the channel is smaller than 46 bps, the corresponding arbitration unit is the arbitration unit 2; if the transmission rate of the data corresponding to the channel is greater than 46 bps, the corresponding arbitration unit is the arbitration unit 2.

The above describes an example in which there are three arbitration units. During implementation, the quantity of the arbitration units may be determined as required. The more the arbitration units are set, the higher the data transmission rate will be;

wherein multiple arbitration units may be prioritized. The higher the transmission rate of the data corresponding to the channel is, the higher the transmission priority of the arbitration unit corresponding to the data corresponding to the channel will be; the smaller the transmission time of the data corresponding to the channel is, the higher the transmission priority of the arbitration unit corresponding to the data corresponding to the channel will be.

Preferably, in step 202, before the determining that the data in the channels corresponding to at least two arbitration units need to be transmitted, the method further includes:

for one arbitration unit among a plurality of arbitration units, a channel corresponding to the arbitration unit among channels, in which data need to be transmitted, may be determined through a fixed priority or in a round-robin mode, and a channel corresponding to the arbitration unit among channels, in which data need to be transmitted, may be also determined through a transmission rate of the data in the channel corresponding to the arbitration unit.

Taking FIG. 3 for example, if the transmission rate of the data corresponding to the first channel is 20 bps, the transmission rate of the data corresponding to the second channel is 40 bps, the transmission rate of the data corresponding to the third channel is 65 bps, the transmission rate of the data corresponding to the fourth channel is 50 bps, and the transmission rate of the data corresponding to the fifth channel is 60 bps, the first channel and the second channel correspond to the arbitration unit 3, the fourth channel corresponds to the arbitration unit 2, the third channel and the fifth channel correspond to the arbitration unit 1, since in the channels corresponding to the arbitration unit 3, the transmission rate of the data corresponding to the second channel is greater than the transmission rate of the data corresponding to the first channel, the arbitration unit 3 determines to first transmit a part of the data in the data corresponding to the second channel, and then transmit a part of the data in the data corresponding to the first channel, and then transmit a part of the data in the data corresponding to the second channel, and so on alternately.

Preferably, command interaction among the arbitration unit 1, the bus command generator 1 and the bus command queue 1 is similar to the aforementioned command interaction among the arbitration unit, the bus command generator and the bus command queue; command interaction among the arbitration unit 2, the bus command generator 2 and the bus command queue 2 is similar to the aforementioned command interaction among the arbitration unit, the bus command generator and the bus command queue; and command interaction among the arbitration unit 3, the bus command generator 3 and the bus command queue 3 is similar to the aforementioned command interaction among the arbitration unit, the bus command generator and the bus command queue, and repeated description will not be provided here;

wherein for the arbitration units with different priorities, the storage capacities of the bus command queue are also different, the higher the priority of the arbitration unit is, the larger the storage capacity of the bus command queue is, and the higher the data transmission rate will be.

Preferably, in step 202, there are many modes for determining that the data in the channels corresponding to at least two arbitration units need to be transmitted, e.g. after receiving data transmission commands corresponding to at least two arbitration units within a set period of time, it is determined that the data in the channels corresponding to at least two arbitration units need to be transmitted, or after receiving transmission commands from at least two arbitration units within a set period of time, it is determined that the data in the channels corresponding to at least two arbitration units need to be transmitted.

Mode 1: after receiving data transmission commands corresponding to at least two arbitration units within a set period of time, it is determined that the data in the channels corresponding to at least two arbitration units need to be transmitted, wherein each arbitration unit corresponds to a different data transmission command;

wherein the set period of time may be any period of time, e.g. 1 millisecond (ms), 100 microseconds (us) and may be set as required.

The case in which when the value of the set period of time is 0, i.e. after receiving the data transmission commands corresponding to at least two arbitration units simultaneously, it is determined that the data in the channels corresponding to at least two arbitration units need to be transmitted, is also applicable to the embodiment of the disclosure.

Preferably, the data transmission commands include: sources addresses, target addresses, and data identifiers. The data transmission commands corresponding to the arbitration units are different in one or more of the followings:

1. the source addresses in the data transmission commands corresponding to the arbitration units are different;

taking FIG. 3 for example, if the first channel corresponds to the arbitration unit 1, the second channel corresponds to the arbitration unit 2, the source address corresponding to the first channel is a Read-Only Memory (ROM), the data identifier corresponding to the first channel is A1, the source address corresponding to the second channel is a PC, the data identifier corresponding to the second channel is A2, and the target addresses corresponding to the first channel and the second channel are ACCs; then the data transmission command corresponding to the arbitration unit 1 includes the ROM, ACC and A1, and the data transmission command corresponding to the arbitration unit 2 includes the PC, ACC and A2. Within a set period of time, the bus controller receives the data transmission command corresponding to the arbitration unit 1 and the data transmission command corresponding to the arbitration unit 2, then it is determined that the data in the channels corresponding to at least two arbitration units need to be transmitted, wherein the source addresses in the data transmission commands corresponding to the arbitration units are different.

2. the target addresses in the data transmission commands corresponding to the arbitration units are different;

taking FIG. 3 for example, if the first channel corresponds to the arbitration unit 1, the second channel corresponds to the arbitration unit 2, the source addresses corresponding to the first channel and the second channel are PCs, the data identifier corresponding to the first channel is A1, the target address corresponding to the first channel is an ROM, the target address corresponding to the second channel is an ACC, the data identifier corresponding to the second channel is A1; then the data transmission command corresponding to the arbitration unit 1 includes the PC, ROM and A1, and the data transmission command corresponding to the arbitration unit 2 includes the PC, ACC and A1. Within a set period of time, the bus controller receives the data transmission command corresponding to the arbitration unit 1 and the data transmission command corresponding to the arbitration unit 2, then it is determined that the data in the channels corresponding to at least two arbitration units need to be transmitted, wherein the target addresses in the data transmission commands corresponding to the arbitration units are different;

3. the data identifiers in the data transmission commands corresponding to the arbitration units are different;

taking FIG. 3 for example, if the first channel corresponds to the arbitration unit 1, the second channel corresponds to the arbitration unit 2, the source addresses corresponding to the first channel and the second channel are PCs, the target addresses corresponding to the first channel and the second channel are ROMs, the data identifier corresponding to the first channel is A1, the data identifier corresponding to the second channel is A2; then the data transmission command corresponding to the arbitration unit 1 includes the PC, ROM and A1, and the data transmission command corresponding to the arbitration unit 2 includes the PC, ROM and A2. Within a set period of time, the bus controller receives the data transmission command corresponding to arbitration unit 1 and the data transmission command corresponding to the arbitration unit 2, then it is determined that the data in the channels corresponding to at least two arbitration units need to be transmitted, wherein the data identifiers in the data transmission commands corresponding to the arbitration units are different;

Mode 2: after receiving transmission commands from at least two arbitration units within a set period of time, it is determined that the data in the channels corresponding to at least two arbitration units need to be transmitted;

wherein the set period of time may be any period of time, e.g. 1 ms, 100 us and may be set as required.

The case in which when the value of the set period of time is 0, i.e. after receiving the transmission commands from at least two arbitration units simultaneously, it is determined that the data in the channels corresponding to at least two arbitration units need to be transmitted, is also applicable to the embodiment of the disclosure, wherein the arbitration unit sends a transmission command to notify the bus controller that data in the channel corresponding to the arbitration unit need to be transmitted.

Preferably, the transmitting the data according to the priorities of the at least two arbitration units includes:

first processing a data transmission command corresponding to the arbitration unit with a higher priority, i.e. first transmitting data of a channel corresponding to the arbitration unit with the higher priority;

wherein the higher the priority of the arbitration unit is, the higher the transmission rate of data in the channel corresponding to the arbitration unit is;

wherein if a transmission command from one arbitration unit is received within a set period of time, it is unnecessary to determine the priority of the arbitration unit and data of a channel corresponding to the arbitration unit is transmitted directly, wherein the priority of the arbitration unit may be stored by the bus controller, and may be also stored by other storage entities. When the priority of the arbitration unit needs to be used, the bus controller takes the priority of the arbitration unit from other storage entities.

The embodiment of the disclosure provides description by taking the case that there are 3 arbitration units and 5 DMA channels as an example. It should be noted that, the embodiment of the disclosure is not limited to 3 arbitration units and 5 DMA channels. According to different application requirements, other situations are also applicable to the embodiment of the disclosure, and modes of execution in other situations are similar to the mode of execution in the embodiment of the disclosure and will not be repeated here.

Figure 4:
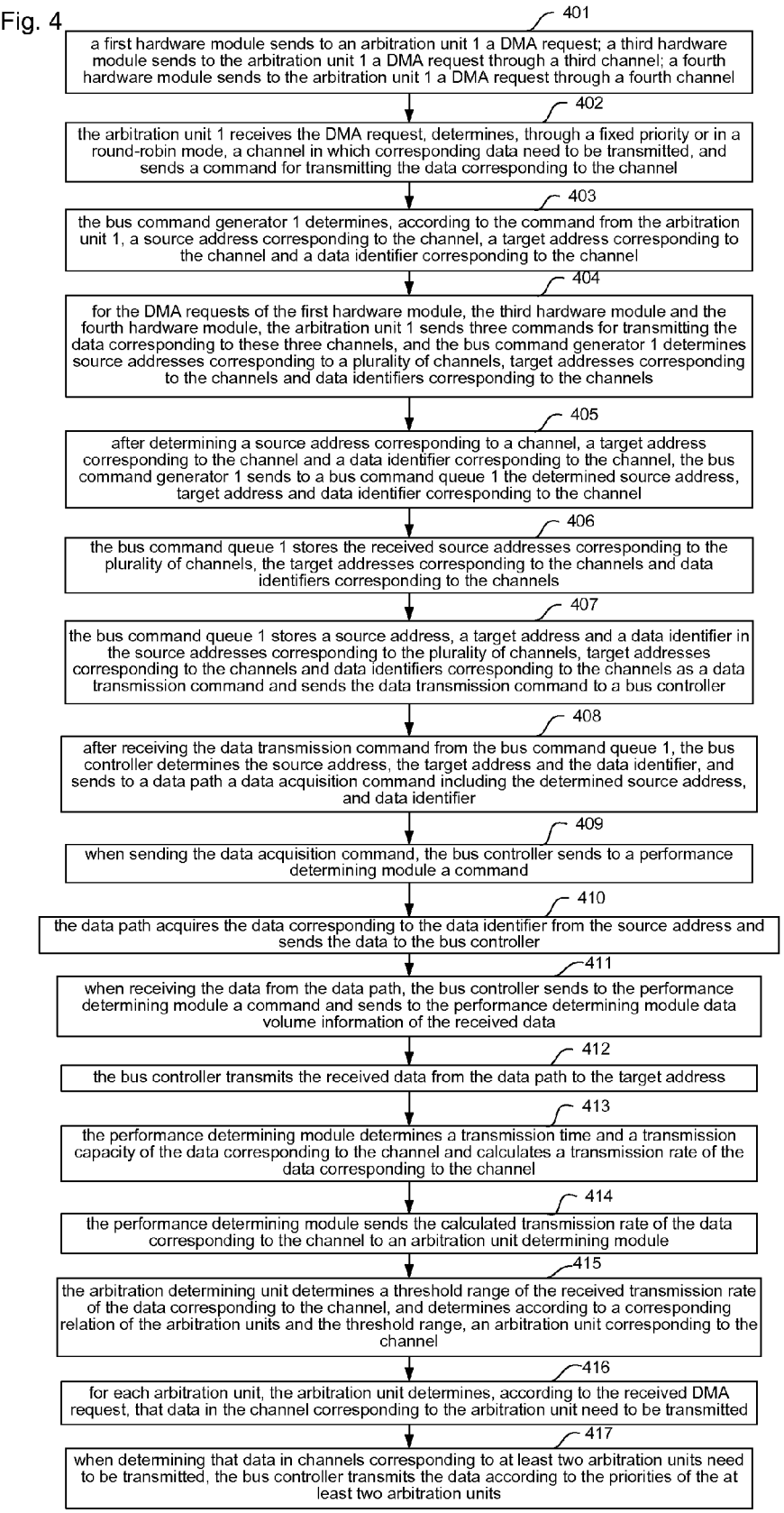
FIG. 4 is a flowchart of a specific data transmission method in an embodiment of the disclosure.

As shown in FIG. 4, a specific data transmission method in an embodiment of the disclosure includes the following steps:

Step 401: a first hardware module sends to an arbitration unit 1 a DMA request through a first channel to request to transmit data M from an address A to an address B; a third hardware module sends to the arbitration unit 1 a DMA request through a third channel to request to transmit data N from an address C to an address D; a fourth hardware module sends to the arbitration unit 1 a DMA request through a fourth channel to request to transmit data O from an address E to an address F;

wherein when transmitting a DMA request for the first time, all hardware modules need to send DMA requests to the same arbitration unit through their respective channels.

During implementation, an arbitration unit for all hardware modules to send the DMA requests at the same time may be set as required, e.g. the DMA requests are sent to the arbitration unit 1 at the same time.

During implementation, the first hardware module may send the DMA request to the arbitration unit 1 through the first channel to request to transmit the data M from the address A to the address B. The first hardware module may also send the DMA request to the arbitration unit 1 through the first channel to request to transmit the data M from the address A to the address B, and send the DMA request to the arbitration unit 1 through the second channel to request to transmit the data N from the address A to the address B, which may be specifically set as required.

Step 402: when receiving the DMA request from the hardware module, the arbitration unit 1 determines, through a fixed priority or in a round-robin mode, a channel in which corresponding data need to be transmitted, and sends to a bus command generator 1 a command for transmitting the data corresponding to the channel so as to indicate the bus command generator 1 to determine a source address corresponding to the channel, a target address corresponding to the channel and a data identifier corresponding to the channel;

wherein an implementation mode of determining by the arbitration unit 1, through the fixed priority or in the round-robin mode, the channel in which the corresponding data need to be transmitted is the same as the implementation mode of determining by the arbitration unit, through the fixed priority or in the round-robin mode, the channel in which the corresponding data need to be transmitted in FIG. 2 and will not be repeated here.

Step 403: the bus command generator 1 determines, according to the command from the arbitration unit 1, a source address corresponding to the channel, the target address corresponding to the channel and the data identifier corresponding to the channel;

Step 404: for the DMA requests of the first hardware module, the third hardware module and the fourth hardware module, the arbitration unit 1 sends, according to fixed priorities or in a round-robin mode, three commands for transmitting the data corresponding to these three channels, and the bus command generator 1 determines source addresses corresponding to a plurality of channels, target addresses corresponding to the channels and data identifiers corresponding to the channels;

Step 405: after determining a source address corresponding to one channel, a target address corresponding to the channel and a data identifier corresponding to the channel, the bus command generator 1 will send to a bus command queue 1 the determined source address corresponding to the channel, the target address corresponding to the channel and the data identifier corresponding to the channel;

Step 406: the bus command queue 1 stores the received source addresses corresponding to the plurality of channels, the target addresses corresponding to the channels and data identifiers corresponding to the channels;

preferably, the source addresses corresponding to the plurality of channels, the target addresses corresponding to the channels and the data identifiers corresponding to the channels may be also stored in other storage entities;

Step 407: the bus command queue 1 stores a source address, a target address, and a data identifier in the source addresses corresponding to the plurality of channels, target addresses corresponding to the channels and data identifiers corresponding to the channels as a data transmission command in an FIFO mode and sends the data transmission command to a bus controller;

wherein the data transmission command includes a source address, a target address and a data identifier to indicate to acquire data corresponding to the data identifier in the source address and transmit the data to the target address;

Step 408: after receiving the data transmission command from the bus command queue 1, the bus controller determines the source address, the target address and the data identifier, and sends to a data path a data acquisition command including the determined source address, and data identifier;

Step 409: when sending the data acquisition command, the bus controller sends to a performance determining module a command to indicate a timer set in the performance determining module to start timing;

Step 410: the data path acquires the data corresponding to the data identifier from the source address and sends the data to the bus controller;

Step 411: when receiving the data from the data path, the bus controller sends to the performance determining module a command to indicate the timer set in the performance determining module to stop timing, and sends to the performance determining module data volume information of the received data;

Step 412: the bus controller transmits the received data from the data path to the target address;

Step 413: the performance determining module determines a transmission time and a transmission capacity of the data corresponding to the channel, and calculates a transmission rate of the data corresponding to the channel;

Step 414: the performance determining module sends the calculated transmission rate of the data corresponding to the channel to an arbitration unit determining module;

Step 415: the arbitration determining unit determines a threshold range of the received transmission rate of the data corresponding to the channel, and determines according to a corresponding relation of the arbitration units and the threshold range, an arbitration unit corresponding to the threshold range of the transmission rate of the data corresponding to the channel, and determines the arbitration unit corresponding to the threshold range to be the arbitration unit corresponding to the channel;

Step 416: for each arbitration unit, the arbitration unit determines, according to the received DMA request, that data in the channel corresponding to the arbitration unit need to be transmitted;

interaction among the arbitration units, the bus command generator and the bus command queue may refer to step 402 to step 407;

Step 417: when determining that data in channels corresponding to at least two arbitration units need to be transmitted, the bus controller transmits the data according to the priorities of the at least two arbitration units, wherein an implementation mode of step 417 may refer to the implementation mode of FIG. 2 in the disclosure.

Based on the same inventive concept, an embodiment of the disclosure further provides a data transmission device and receiving device. Since the device solves problems according to the same principle as that of the method of the embodiment of the disclosure, implementation of the device may refer to implementation of the method, and repeated parts will not be described here.

Figure 5:
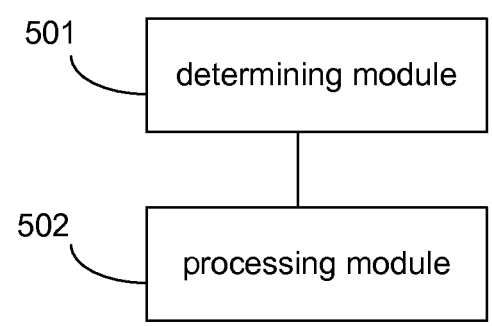
FIG. 5 is a structural diagram of a data transmission device in an embodiment of the disclosure.

FIG. 5 is a structural diagram of a data transmission device in an embodiment of the disclosure. As shown in FIG. 5, the data transmission device of the embodiment of the disclosure includes:

a determining module 501 configured to determine, for a DMA channel, an arbitration unit corresponding to the channel among a plurality of arbitration units according to transmission performance corresponding to data in the channel;

a processing module 502 configured, when determining that the data in channels corresponding to at least two arbitration units need to be transmitted, to transmit the data according to priorities of the at least two arbitration units.

Preferably, for a DMA channel, the transmission performance corresponding to the data in the channel is a transmission time of the data corresponding to the channel or a rate of the data corresponding to the channel;

the determining module 501 is configured to determine the transmission time of the data corresponding to the channel or the rate of the data corresponding to the channel.

Preferably, the transmission performance corresponding to the data in the channel is the transmission rate of the data corresponding to the channel; the determining module 501 is configured to determine a transmission time and a transmission capacity of the data corresponding to the channel, and to determine, according to the transmission time and the transmission capacity, the transmission performance corresponding to the data in the channel.

Preferably, the determining module 501 is configured to determine a threshold range of the transmission performance corresponding to the data in the channel, according to a corresponding relation of the arbitration units and the threshold range, to determine an arbitration unit corresponding to the threshold range of the transmission performance corresponding to the data in the channel, and to use the determined arbitration unit corresponding to the threshold range as the arbitration unit corresponding to the channel.

Preferably, the processing module 502 is configured, after receiving data transmission commands corresponding to the at least two arbitration units within a set period of time, to determine that the data in the channels corresponding to the at least two arbitration units need to be transmitted, wherein the data transmission commands corresponding to the arbitration units are different.

Preferably, the data transmission commands include: source addresses, target addresses and data identifiers; the data transmission commands corresponding to the arbitration units are different in one or more of the followings: the source addresses in the data transmission commands corresponding to the arbitration units are different; the target addresses in the data transmission commands corresponding to the arbitration units are different; the data identifiers in the data transmission commands corresponding to the arbitration units are different;

wherein in the embodiment of the data transmission device of the disclosure, the determining module 501 is equivalent to the arbitration unit determining module in the arbitration structure (see FIG. 3) in the embodiment of the disclosure, the processing module 502 is equivalent to the bus controller in the arbitration structure in the embodiment of the disclosure; when the determining module 501 is configured to determine the transmission time and the transmission capacity of the data corresponding to the channel, and to determine the transmission performance corresponding to the data in the channel according to the transmission time and the transmission capacity, the determining module 501 is also equivalent to the performance determining module in the arbitration structure in the embodiment of the disclosure.

In addition, the determining module 501 and the processing module 502 may be implemented by a CPU, a Micro Processing Unit (MPU), a Digital Signal Processor (DSP) and a Field-Programmable Gate Array (FPGA) in the device.

Preferably, the embodiment of the disclosure further includes the DMA channels, the bus command generator and the bus command queue etc., as shown in FIG. 3. Please refer to implementation of FIG. 2 of the disclosure and implementation of FIG. 4 of the disclosure for implementation modes of a hardware module for sending a DMA request, a DMA channel, a bus command generator, a bus command queue and a data path unit etc.;

wherein the above provides introduction by taking the case that there are a limited number of DMA channels, arbitration unit determining modules, arbitration units, bus command generators and bus command queues for example. During implementation, the number of DMA channels, arbitration unit determining modules, arbitration units, bus command generators and bus command queues may be set as required as long as the following requirement is satisfied: there are the same number of DMA channels, arbitration unit determining modules, arbitration units, bus command generators and bus command queues.

Those skilled in the art should understand that the embodiments of the disclosure may be provided as methods, systems, or computer program products. Thus, the disclosure may take the form of an entire hardware embodiment, an entire software embodiment or an embodiment combining software and hardware aspects. Furthermore, the embodiments of the disclosure may take the form of a computer program product which is embodied on one or more computer-usable storage media (including, but not limited to, disk storage devices, Compact Disc ROMs (CD-ROM), optical storage devices, and so forth) having computer-usable program codes embodied therein.

The disclosure has been described with reference to flowcharts and/or block diagrams of methods, apparatuses (systems) and computer program products according to embodiments of the disclosure. It will be understood that each flow and/or block of the flowcharts and/or block diagrams, and combinations of flows and/or blocks in the flowcharts and/or block diagrams, can be implemented by computer program instructions. These computer program instructions may be provided to a processor of a general purpose computer, a special purpose computer, an embedded processor or other programmable data processing apparatuses to produce a machine, such that the instructions, which are executed via the processor of the computer or other programmable data processing apparatuses, are used for realizing devices for implementing functions specified in one or more flows in the flowcharts and/or one or more blocks in the block diagrams.

These computer program instructions may be also stored in a computer-readable memory that can direct a computer or other programmable data processing apparatuses to function in a particular manner, such that the instructions stored in the computer-readable memory produce an article of manufacture including an instruction device which implements the functions specified in one or more flows in the flowcharts and/or one or more blocks in the block diagrams.

These computer program instructions may be also loaded onto a computer or other programmable data processing apparatuses to cause a series of operational steps to be performed on the computer or other programmable apparatuses to produce a computer implemented process such that the instructions which are executed on the computer or other programmable apparatuses provide steps for implementing the functions specified in the one or more flows in the flowcharts and/or one or more blocks in the block diagrams.

While the preferred embodiments of the disclosure have been described, additional variations and modifications in these embodiments may occur to those skilled in the art once they learn of the basic inventive concepts. Therefore, it is intended that the appended claims shall be construed to include both the preferred embodiments and all such variations and modifications falling within scope of the disclosure.

Apparently, those in the art may make modifications and variations without departing from the spirit and scope of the disclosure. Therefore, if these modifications and variations are made based on the claims and equivalent techniques of the disclosure, the disclosure also intends to include these modifications and variations.

What is claimed is:

1. A data transmission method, comprising:
   for a Direct Memory Access (DMA) channel, receiving, by an arbitration unit, a DMA request through the DMA channel from a hardware component to perform data transmission, determining an arbitration unit corresponding to the channel among a plurality of arbitration units according to transmission performance corresponding to data in the channel;
   when determining that data in channels corresponding to at least two arbitration units need to be transmitted, judging which data is to be transmitted firstly according to priorities of the at least two arbitration units; and
   sending, by the arbitration units, a command of data transmission to a bus command generator according to priorities of the arbitration units to perform data transmission by a bus controller;
   wherein the determining that data in channels corresponding to at least two arbitration units need to be transmitted comprises: after receiving data transmission commands corresponding to the at least two arbitration units within a set period of time, determining that the data in the channels corresponding to the at least two arbitration units need to be transmitted, wherein the data transmission commands corresponding to the arbitration units are different;

wherein the data transmission command comprises: a source address, a target address and a data identifier; the data transmission commands corresponding to the arbitration units are different in one or more of the followings: source addresses in the data transmission commands corresponding to the arbitration units are different; target addresses in the data transmission commands corresponding to the arbitration units are different; and data identifiers in the data transmission commands corresponding to the arbitration units are different.

2. The method according to claim 1, wherein the transmission performance corresponding to the data in the channel is a transmission time of the data corresponding to the channel or a transmission rate of the data corresponding to the channel.

3. The method according to claim 2, wherein when the transmission performance corresponding to the data in the channel is the transmission rate of the data corresponding to the channel, determining the transmission performance corresponding to the data in the channel comprises:

determining the transmission time and a transmission capacity of the data corresponding to the channel;

determining the transmission performance corresponding to the data in the channel according to the transmission time and the transmission capacity.

4. The method according to claim 1, wherein the determining an arbitration unit corresponding to the channel among a plurality of arbitration units according to transmission performance corresponding to data in the channel comprises:

determining a threshold range of the transmission performance corresponding to the data in the channel;

according to a corresponding relation of the arbitration units and the threshold range, determining an arbitration unit corresponding to the threshold range of the transmission performance corresponding to the data in the channel, and using the determined arbitration unit corresponding to the threshold range as the arbitration unit corresponding to the channel.

5. A data transmission device, comprising:

a determining module configured, for a Direct Memory Access (DMA) channel, to determine an arbitration unit corresponding to the channel among a plurality of arbitration units according to transmission performance corresponding to data in the channel;

a processing module configured, when determining that data in channels corresponding to at least two arbitration units need to be transmitted, to judge which data is to be transmitted firstly according to priorities of the at least two arbitration units; and the arbitration unit configured to receive a DMA request through the DMA channel from a hardware component to perform data transmission, and to send a command of data transmission to a bus command generator according to priorities of the arbitration units to perform data transmission by a bus controller;

wherein the processing module is configured, after receiving data transmission commands corresponding to the at least two arbitration units within a set period of time, to determine that the data in the channels corresponding to the at least two arbitration units need to be transmitted; wherein the data transmission commands corresponding to the arbitration units are different;

wherein the data transmission command comprises: a source address, a target address and a data identifier; the data transmission commands corresponding to the arbitration units are different in one or more of the followings: source addresses in the data transmission commands corresponding to the arbitration units are different; target addresses in the data transmission commands corresponding to the arbitration units are different; data identifiers in the data transmission commands corresponding to the arbitration units are different.

6. The device according to claim 5, wherein the transmission performance corresponding to the data in the channel is a transmission time of the data corresponding to the channel or a transmission rate of the data corresponding to the channel;

the determining module is configured to determine the transmission time of the data corresponding to the channel or the transmission rate of the data corresponding to the channel.

7. The device according to claim 6, wherein the transmission performance corresponding to the data in the channel is the transmission rate of the data corresponding to the channel;

the determining module is configured to determine the transmission time and a transmission capacity of the data corresponding to the channel, and to determine the transmission performance corresponding to the data in the channel according to the transmission time and the transmission capacity.

8. The device according to claim 5, wherein the determining module is configured to determine a threshold range of the transmission performance corresponding to the data in the channel, to determine an arbitration unit corresponding to the threshold range of the transmission performance corresponding to the data in the channel according to a corresponding relation of the arbitration units and the threshold range, and to use the determined arbitration unit corresponding to the threshold range as the arbitration unit corresponding to the channel.

* * * * *